(12) United States Patent
Hassan-Ali et al.

(10) Patent No.: US 8,045,539 B2
(45) Date of Patent: Oct. 25, 2011

(54) VIRTUAL GROUP CONNECTION SCHEME FOR ATM ARCHITECTURE IN AN ACCESS NODE

(75) Inventors: Mudhafar Hassan-Ali, Rohner Park, CA (US); Jeff Mendelson, Petaluma, CA (US); Annie Rastello, Rohnert Park, CA (US); Li-Sheng Chen, Petaluma, CA (US); Radimir Shilshtut, Rohnert Park, CA (US); Sina Soltani, Rohnert Park, CA (US); Francisco Moreno, Petaluma, CA (US)

(73) Assignee: Alcatel Lucent, Paris (FR)

( * ) Notice: Subject to any disclaimer, the term of this patent is extended or adjusted under 35 U.S.C. 154(b) by 1925 days.

(21) Appl. No.: 10/280,604

(22) Filed: Oct. 25, 2002

(65) Prior Publication Data

US 2004/0081137 A1 Apr. 29, 2004

(51) Int. Cl.
*H04L 12/66* (2006.01)
*H04L 12/28* (2006.01)

(52) U.S. Cl. ........................................ 370/352; 370/398

(58) Field of Classification Search ........................ None
See application file for complete search history.

(56) References Cited

U.S. PATENT DOCUMENTS

| | | | |
|---|---|---|---|
| 4,878,048 A | 10/1989 | Gottesman et al. | |
| 5,119,370 A | 6/1992 | Terry | |
| 5,237,565 A | 8/1993 | Henrion et al. | |
| 5,287,355 A | 2/1994 | Takahashi et al. | |
| 5,383,180 A | 1/1995 | Kartalopoulos | |
| 5,396,622 A | 3/1995 | Lee | |
| 5,526,344 A | 6/1996 | Langdon et al. | |
| 5,734,656 A | 3/1998 | Prince et al. | |
| 5,784,371 A | 7/1998 | Iwai | |
| 5,850,399 A | 12/1998 | Ganmukhi et al. | |
| 5,859,835 A | 1/1999 | Varma et al. | |
| 5,862,136 A | 1/1999 | Irwin | |
| 5,875,190 A | 2/1999 | Law | |
| 5,878,042 A | 3/1999 | Fraas et al. | |
| 5,884,064 A * | 3/1999 | Rosenberg | 370/395.3 |
| 5,889,773 A | 3/1999 | Stevenson, III | |
| 5,896,382 A | 4/1999 | Davis et al. | |
| 5,901,024 A | 5/1999 | Deschaine et al. | |
| 5,926,479 A | 7/1999 | Baran | |
| 5,953,338 A | 9/1999 | Ma | |
| 6,064,650 A | 5/2000 | Kappler et al. | |

(Continued)

FOREIGN PATENT DOCUMENTS

EP 0 901 302 A2 3/1999

(Continued)

OTHER PUBLICATIONS

Giroux, Natalie and Ganti, Sudhakar, "Queuing and Scheduling", Quality of Service in ATM Networks: State of the Art Traffic Management, Chapter 5, pp. 85-121.

(Continued)

*Primary Examiner* — Salman Ahmed
*Assistant Examiner* — Sori Aga
(74) *Attorney, Agent, or Firm* — Galasso & Associates, L.P.

(57) ABSTRACT

A Virtual Group Connection (VGC) scheme for grouping ATM connections. A plurality of VPCs, VCCs, or both are managed together as a single virtual data pipe having a pool of common connection resources (e.g., bandwidth, buffering, etc.) associated therewith. Shaping, grooming, policing, switching, and other traffic engineering operations may be performed on a VGC as a single connection hierarchy operable to be associated with a single customer.

31 Claims, 8 Drawing Sheets

U.S. PATENT DOCUMENTS

| | | | |
|---|---|---|---|
| 6,064,651 A | 5/2000 | Rogers et al. | |
| 6,081,507 A | 6/2000 | Chao et al. | |
| 6,097,722 A * | 8/2000 | Graham et al. | 370/395.21 |
| 6,128,295 A | 10/2000 | Larsson et al. | |
| 6,353,593 B1 | 3/2002 | Chen | |
| 6,366,582 B1 * | 4/2002 | Nishikado et al. | 370/401 |
| 6,370,159 B1 | 4/2002 | Eidson | |
| 6,411,957 B1 | 6/2002 | Dijkstra | |
| 6,415,325 B1 | 7/2002 | Morrien | |
| 6,434,140 B1 | 8/2002 | Barany et al. | |
| 6,438,106 B1 * | 8/2002 | Pillar et al. | 370/232 |
| 6,480,487 B1 | 11/2002 | Wegleitner et al. | |
| 6,480,511 B1 | 11/2002 | Petty | |
| 6,574,217 B1 | 6/2003 | Lewis et al. | |
| 6,665,263 B1 * | 12/2003 | Kawabata et al. | 370/219 |
| 6,728,239 B1 | 4/2004 | Kung et al. | |
| 6,748,439 B1 * | 6/2004 | Monachello et al. | 709/229 |
| 6,904,060 B2 | 6/2005 | Nelson et al. | |
| 6,914,898 B2 | 7/2005 | Sasagawa et al. | |
| 6,950,441 B1 | 9/2005 | Kaczmarczyk et al. | |
| 7,068,659 B1 * | 6/2006 | Hamedani et al. | 370/395.2 |
| 7,230,948 B2 * | 6/2007 | Agnevik et al. | 370/395.6 |
| 2002/0196793 A1 * | 12/2002 | Samba et al. | 370/401 |
| 2005/0259571 A1 * | 11/2005 | Battou | 370/217 |

FOREIGN PATENT DOCUMENTS

| | | |
|---|---|---|
| EP | 0 961 512 A1 | 12/1999 |
| EP | 0961512 A1 | 12/1999 |
| EP | 1 093 266 A2 | 4/2001 |
| EP | 1 111 855 A2 | 6/2001 |
| EP | 1 111 858 A2 | 6/2001 |
| EP | 0 522 773 A2 | 5/2004 |
| EP | 0 713 347 A2 | 5/2004 |
| WO | 97/04558 | 2/1997 |
| WO | 00/11880 A2 | 3/2000 |
| WO | 01/86884 A1 | 11/2001 |
| WO | 0186884 A1 | 11/2001 |

OTHER PUBLICATIONS

Kaufman, Jill et al "ATM Forum Education Corner", at http://www.atmforum.com/pages/library/53bytes/backissues/others/53bytes-0994-4.html.

Traffic Management Specification, The ATM Forum Technical Committee, Version 4.1, AF-TM-0121.000, Mar. 1999.

Knuth, D.E.; "The Art of Computer Programming, vol. 3: Sorting and Searching"; 1973; Addison-Wesley Publishing Company, Inc.; USA.

* cited by examiner

VIRTUAL GROUP CONNECTION SCHEME FOR ATM ARCHITECTURE IN AN ACCESS NODE

TO RELATED APPLICATION(S)

This application discloses subject matter related to the subject matter disclosed in the following commonly owned co-pending U.S. patent applications: (i) "Stackplane Architecture," filed Dec. 22, 1999, application Ser. No. 09/469,897, in the names of James W. Dove et al.; (ii) "Scalable Architecture For An Access Node," filed Jun. 27, 2002, application Ser. No. 10/184,386, in the name(s) of Eric Friedrichs et al.; (iii) "Integrated Gateway Functionality In An Access Network Element," filed Nov. 2, 2001, application Ser. No. 10/052,846, in the names of Thornton Collins et al.; (iv) "Multicasting System And Method For Use In An Access Node's ATM Switch Fabric," filed even date herewith, application Ser. No. 10/280,959, in the names of Mudhafar Hassan-Ali et al.; (v) "System And Method For Implementing GFR Service In An Access Node's ATM Switch Fabric," filed even date herewith, application Ser. No. 10/280,700, in the names of Mudhafar Hassan-Ali et al.; (vi) "Calendar Heap System And Method For Efficient Sorting," filed even date herewith, application Ser. No. 10/281,033, in the names of Mudhafar Hassan-Ali et al.; (vii) "Hierarchical Scheduler Architecture For Use With An Access Node," filed even date herewith, application Ser. No. 10/280,894, in the names of Mudhafar Hassan-Ali et al., which are hereby incorporated by reference herein for all purposes.

BACKGROUND OF THE INVENTION

1. Technical Field of the Invention

The present invention generally relates to telecommunications. More particularly, and not by way of any limitation, the present invention is directed to a Virtual Group Connection (VGC) scheme for Asynchronous Transfer Mode (ATM) architecture in an access node.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. Liberalized governmental activity with respect to telecommunications is another factor, which is fostering broader competition through deregulation in local area markets everywhere. The third and final factor is congestion in the Public Switched Telephone Network (PSTN), originally designed and developed for voice-only traffic.

There have been several important advances in telecommunications technology that enable high rates of throughput in carrier networks' backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access have been beset by the limitations of the existing twisted-pair copper cable infrastructure (i.e., access network) provided between a carrier's central office (CO) and a subscriber's remote site, typically referred to as the local loop. In the telecommunications art, these limitations are sometimes collectively described as the "last-mile" problem.

Current access network solutions that attempt to avoid the bottleneck created by the last-mile problem involve the use of fiber optic technology in the local loop also. As with the high-speed carrier networks, the fiber-based local loop infrastructure is typically architected using SONET as the physical layer technology. With recent developments in optical components and related opto-electronics, in addition to improvements in network design, broadband access is now becoming commonplace.

Moreover, coupled with the phenomenal growth in popularity of the Internet, there has been a tremendous interest in using packet-switched network (PSN) infrastructures (e.g., those based on Internet Protocol (IP) addressing) as a replacement for the existing circuit-switched network (CSN) infrastructures used in today's telecommunications networks. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Accordingly, a new breed of service-centric networks (distinct from the existing voice-centric and data-centric networks) are being explored for implementation on what is known as the next-generation network (NGN) infrastructure, where integrated voice/data/video applications may be provisioned using a packet transport mechanism over a PSN in an end-to-end transmission path. As alluded to hereinabove, it is believed that using a packet network infrastructure in access networks provides higher transmission efficiency, lower operation and maintenance costs, and a unified access.

Traditional access systems allow accessing a digital local voice switch, such as a Class 5 switch, by extending a plurality of metallic loops and aggregating them in a bundle for efficiently transmitting the time-division multiplexed (TDM) voice traffic. Typically, such access networks are architected using one or more access nodes in a variety of configurations, e.g., point-to-point chains, rings, etc., wherein an access node may itself comprise several channel banks that provide line interfaces servicing a large number of subscribers.

In order to afford increased levels of functionality and service provisioning, however, access networks of today are being required to support advanced transport mechanisms such as SONET for the internal architecture of the nodes as well. In such nodes, ATM is used for carrying most of the subscriber traffic, except the traditional TDM services such as T1 and TDM-DS3 services. Accordingly, both TDM as well as ATM switching fabrics need to be supported in the access node design.

The ATM Forum provides a set of specifications governing the various aspects of an ATM switching fabric, including the connection types. Whereas the connection hierarchy supported by the ATM standards provides sufficient granularity for most ATM applications, there is no mechanism for customer-level connection management.

SUMMARY OF THE INVENTION

Accordingly, the present invention is directed to a Virtual Group Connection (VGC) scheme for grouping ATM connections into a single virtual data pipe that can be associated with a particular customer, e.g., an Internet Service Provider (ISP), a Competitive Local Exchange Carrier (CLEC), and the like. A plurality of VPCs, VCCs, or both are bundled and managed together as a single virtual pipe (called a VGC) having a pool of common connection resources (e.g., bandwidth, buffering, etc.) associated therewith. Shaping, grooming, policing, switching, and other traffic engineering operations may be performed on the VGC as a single connection hierarchy operable to be associated with a single customer.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

An embodiment of the present invention will now be set forth in light of the teachings provided in the commonly owned co-pending U.S. patent application entitled "Hierarchical Scheduler Architecture For Use With An Access Node," filed even date herewith, application Ser. No. 10/280, 894, in the names of Mudhafar Hassan-Ali et al., (hereinafter, the *Hierarchical Scheduler Architecture* application), incorporated by reference hereinabove. As described in detail in that application, a telecommunications node disposed in an access network may be comprised of a scalable architecture wherein both TDM and ATM switching fabrics are provided in order to support increased levels of functionality.

Figure 1:
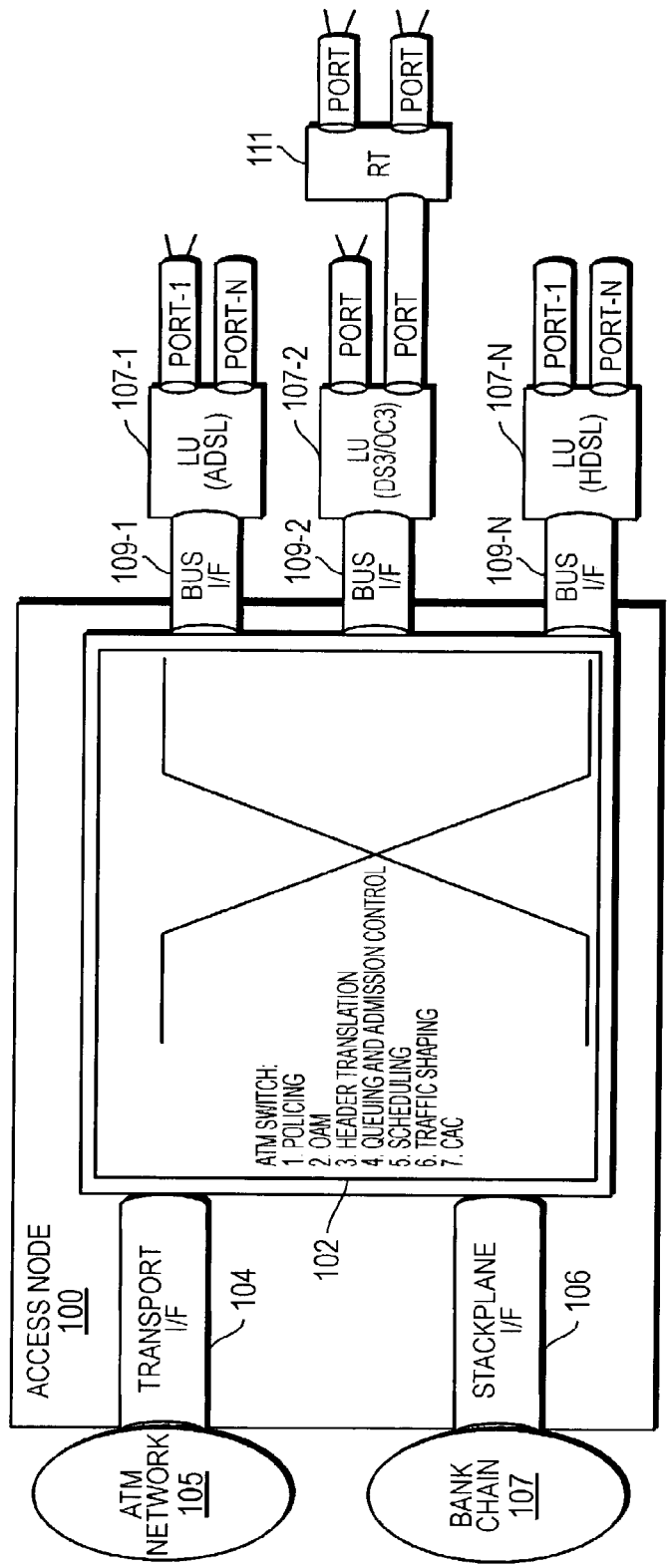
FIG. 1 depicts an exemplary access node having an ATM switching fabric wherein the teachings of the present invention may be advantageously practiced.

Referring now to the drawings of the present patent application, wherein like or similar elements are designated with identical reference numerals throughout the several views thereof and the various elements depicted are not necessarily drawn to scale, and referring in particular to FIG. 1, depicted therein is an exemplary access node 100 having a high level functional representation of an ATM switch fabric 102, wherein the teachings of the present invention may be advantageously practiced. As explained in the *Hierarchical Scheduler Architecture* application referenced above, the overall functionality of the switch fabric 102 includes: policing; operation, administration and maintenance (OAM); header translation; queuing and admission control; and scheduling and traffic shaping. As can be readily seen, traffic to the fabric 102 is provided via a number of interfaces. A transport interface 104 is operable to connect the node's fabric to a backbone network, e.g., ATM network 105. A stackplane interface 106 is operable to carry the traffic from a secondary shelf bank chain 107 (e.g., comprising channel banks 506-1 through 506-4 and channel banks 508-1 through 508-4 shown in FIG. 5 of the *Hierarchical Scheduler Architecture* application) to the fabric 102. A plurality of subscriber interfaces via line units (LUs) 107-1 through 107-N exemplify various service sources such as xDSL, T1, ISDN, DS-3/OC-3, etc., that can interface with the fabric 102 through appropriate bus level ports 109-1 through 109-N. One of the ports of a line unit may be coupled to an RT 111 as part of an access network (not shown in this FIG.).

Two types of ATM connections may be defined with respect to the internal ATM traffic: Virtual Channel Connections (VCCs) and Virtual Path Connections (VPCs). A VCC is typically the lowest flow granularity an ATM connection may have, which is identified by a unique value comprising a pair of identifiers, i.e., Virtual Channel Identifier (VCI) and Virtual Path Identifier (VPI), on a physical interface. A VPC, on the other hand, is defined as a group of all flows that share the same VPI value and a common pool of resources (e.g., bandwidth, et cetera). Thus, it can be seen that a VP is a bundling of VCs which can simplify the management of the connections in an ATM environment by reducing the number of elements to manage, wherein each connection is identified by its unique VPI/VCI pair.

From the standpoint of topology, a VCC or a VPC can be either of the following two types: (i) point-to-point connections, wherein bi-directional connections are established and the sources in each direction may be different and (ii) point-to-multipoint connections, which typically utilize a plurality of uni-directional connections for multicast transport across the fabric.

Figure 2:
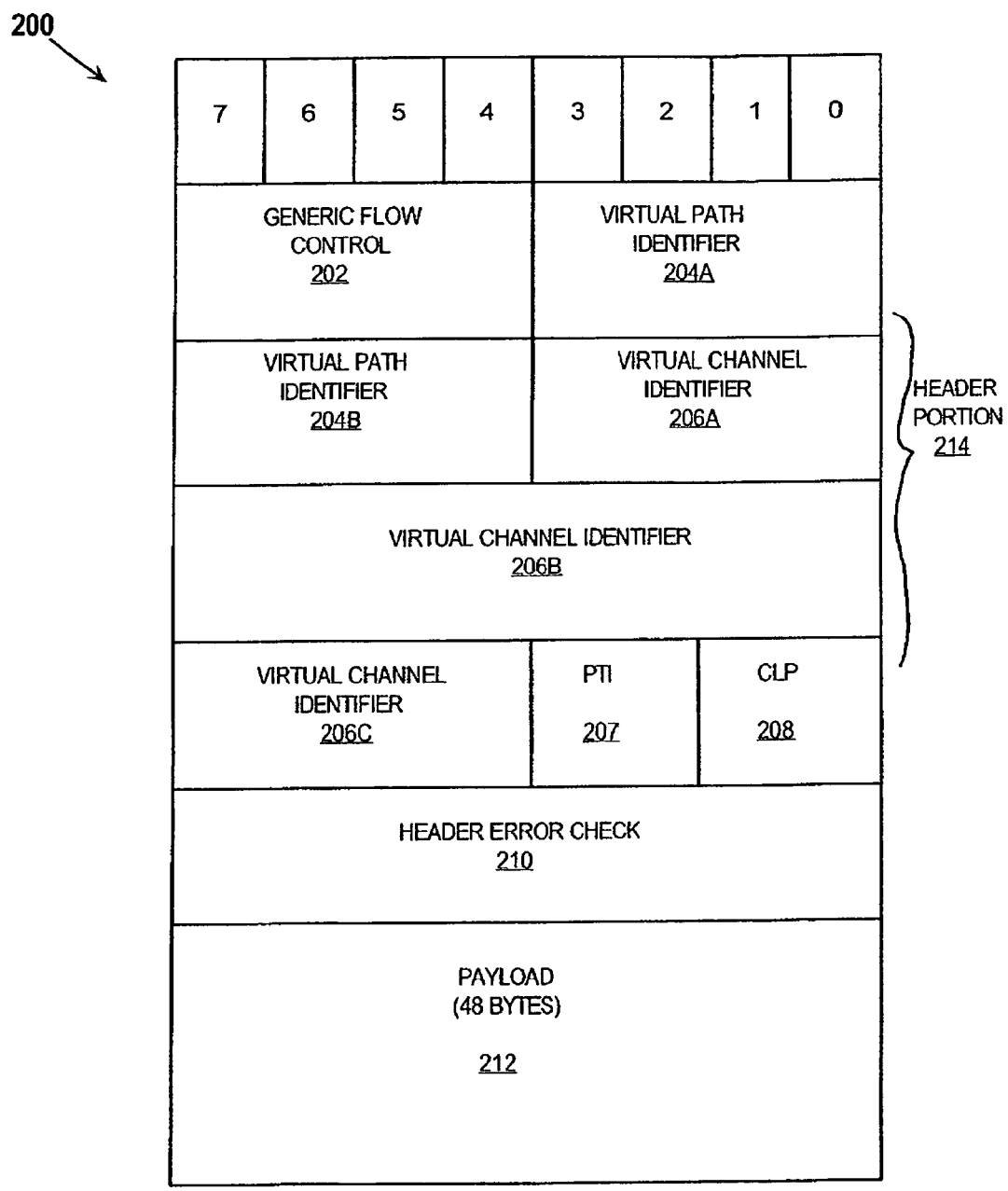
FIG. 2 depicts an ATM cell.

As is well known, ATM uses fixed-size transfer units called cells as the basic transfer unit, which provides for unique identification of the connections by the contents of its header portion. FIG. 2 depicts an ATM cell format 200 that includes a 48-byte payload 212 and a 5-byte header portion 214. The following sets forth the functionality of the header portion: a Generic Flow Control (GFC) portion 202 of 4 bits; 8 bits for a VP identifier portion comprising fields 204A and 204B; 16 bits for a VC identifier portion comprising fields 206A-C; a Payload Type Identifier (PTI) portion 207 of 3 bits; a single-bit Cell Loss Priority (CLP) portion of 208; and an 8-bit Header Error Check (HEC) portion 210.

The GFC field 202 is designed to control the rate of a terminal using a stop-and-go flow control scheme. The HEC portion 210 can be used for effectuating a cyclic redundancy check (CRC) code operable to detect errors in the header portion 214. The CRC code may be used, for example, to prevent sending a cell to the wrong destination (i.e., cell misinsertion). The PTI field 207 is operable to indicate whether the payload contains user data, signaling, or maintenance information. The CLP field 208 can be used by an application to indicate whether certain cells are tagged as lower discard priority cells. Finally, the VP and VC identifier portions of the header portion 214 are used to uniquely identify the ATM connections and define their interrelationship, i.e., bundling of VC connections into VPs.

Figure 3:
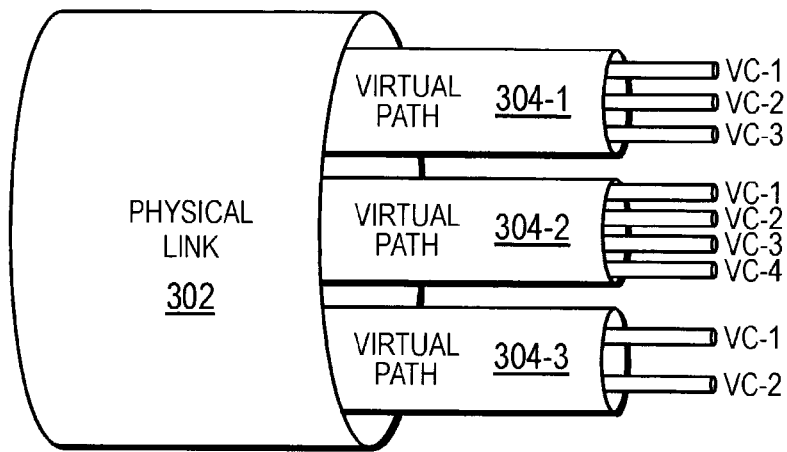
FIG. 3 depicts a conventional ATM connection hierarchy.

Referring now to FIG. 3, depicted therein is an exemplary representation of a conventional ATM connection hierarchy. A physical link 302 is shared among three VP bundles 304-1 through 304-3. Each VP bundle in turn comprises a plurality of VC connections. For instance, VP 304-1 includes VC-1 through VC-3, wherein each VC has a unique ID number while they all share the same VPI. Likewise, VP 304-2 includes VC-1 through VC-4 and VP 304-3 includes VC-1 and VC-2. As alluded to above, the bundling of VC connections into VP bundles simplifies the overall complexity and management of the ATM environment, be it an ATM switch (i.e., an ATM-capable access node) or a transport network.

Depending on functionality, some switches support both VCs and VPs. However, a VP switch supports only VP connections and is not aware of the VCs that are using the VP. Such switches do not perform VC processing and therefore do not maintain any VC information.

Figure 4:
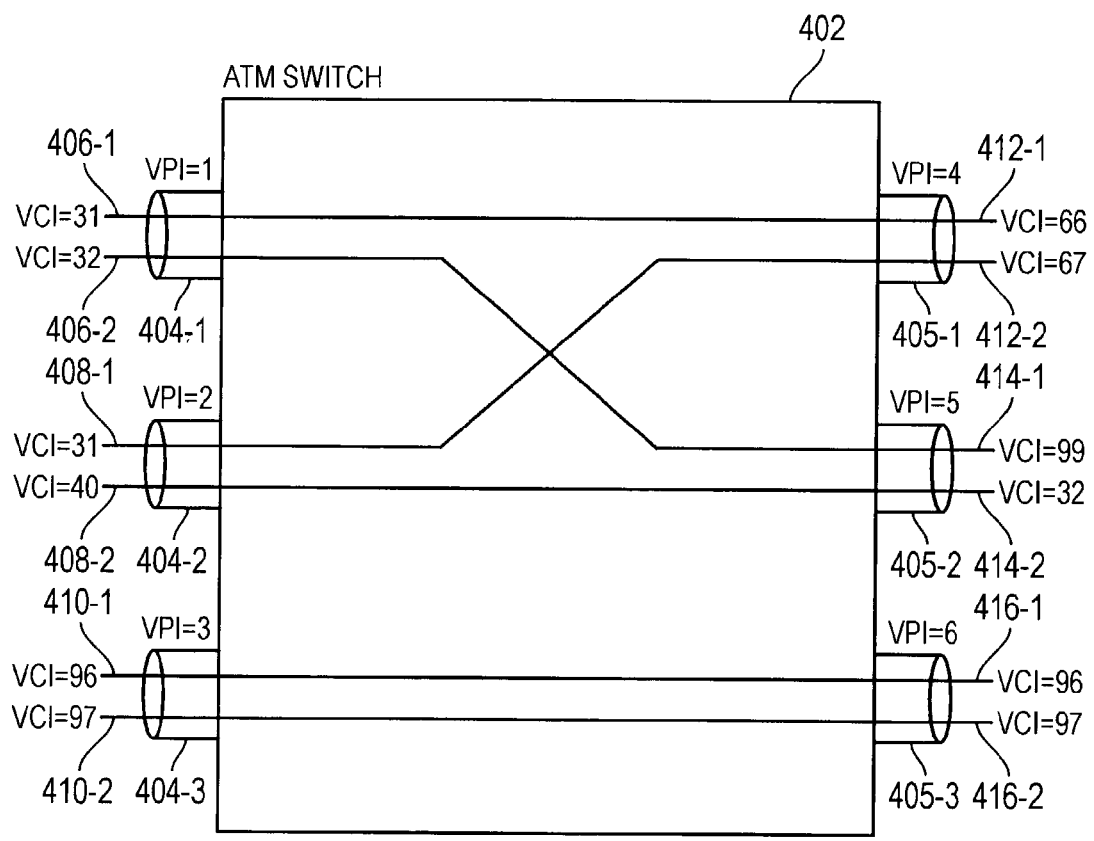
FIG. 4 depicts an embodiment of an ATM switch for effectuating conventional VPC-based or VCC-based switching.

FIG. 4 depicts an embodiment of an ATM switch 402 for effectuating both VPC-based and VCC-based switching in conventional manner. Reference numerals 404-1 through 404-3 refer to three ingress interfaces to the ATM switch 402, wherein each interface is operable to support a VP. For instance, interface 404-1 supports a VP whose VPI=1. Likewise, interfaces 404-2 and 404-3 support VP bundles with VPI=2 and 3, respectively. Further, each ingress VP includes a bundle of two VC connections. VC connections 406-1 and 406-2 within VP 404-1 are identified as having VCI=31 and 32, respectively. In similar fashion, interface 404-2 supports a VP (with VPI=2) comprised of VCC 408-1 (VCI=31) and VCC 408-2 (VCI=40), and interface 404-3 supports a VP (with VPI=3) comprised of VCC 410-1 (VCI=96) and VCC 410-2 (VCC=97).

Three egress interfaces 405-1 through 405-3 are provided with the ATM switch 402, each of which supports a VP. A VP (VPI=4) supported by interface 405-1 is comprised of VCC 412-1 (VCI=66) and VCC 412-2 (VCI=67). Likewise, VP (VPI=5) supported by interface 405-2 is comprised of VCC 414-1 (VCI=99) and VCC 414-2 (VCI=32), and VP (VPI=6) supported by interface 405-3 is comprised of VCC 416-1 (VCI=96) and VCC 416-2 (VCI=97).

As to the ingress interfaces 404-1, 404-2 and egress interfaces 405-1, 405-2, the ATM switch 402 provides virtual channel service wherein the switch examines both the VPI and VCI to determine how to forward each cell. That is, the values of both the VPI and VCI will change as the cell traverses the ATM environment. For example, a cell entering the switch environment with VPI=1 and VCI=32 will exit the switch environment with VPI=5 and VCI=99. A virtual path service can also be provided by the ATM switch environment 402 between the ingress interface 404-3 and egress interface 405-3. In this case, the environment makes the cell forwarding decision based on only the value of the VPI. Thus, a cell entering the switch environment with VPI=3 and VCI=96 will exit with VPI=6 and VCI=96. The VCI is not changed because it is not processed for purposes of cell forwarding decision-making.

Figure 5:
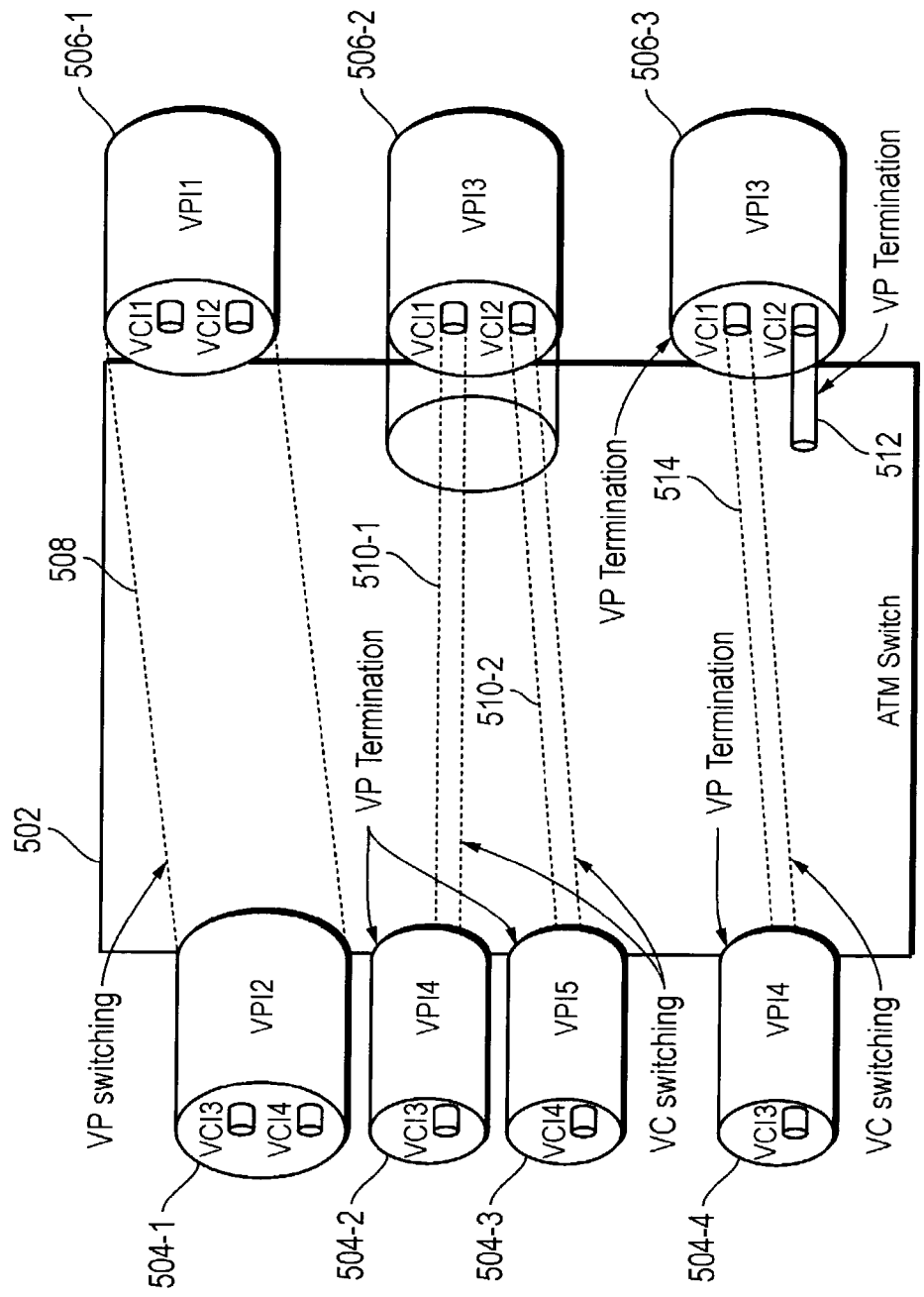
FIG. 5 depicts another embodiment of an ATM switch for effectuating conventional VPC-based or VCC-based switching.

FIG. 5 depicts another embodiment of an ATM switch environment 502 for effectuating VCC-based and VPC-based switching, wherein a VP or VC can be terminated in the switch. Similar to the discussion above, four ingress VPs and three egress VPs are provided with the switch environment 502. Ingress VP 504-1 (VPI=2) is operable to be switched to egress VP 506-1 (VPI=1) via VP switching path 508, wherein the cell forwarding decision is based on the VPI alone. Reference numerals 504-2 and 504-3 refer to two ingress VPs that are terminated at the switch 502. The VCCs of these ingress VPs are operable to be switched to the VCCs of the egress VP 506-2 that is also terminated at the switch 502. Reference numerals 510-1 and 510-2 refer to the two VC switching paths wherein both VPI and VCI values are utilized for cell forwarding. Likewise, a VC switching path 514 is established between the non-terminating VCC of VP 504-4 and the non-terminating VCC of VP 506-3, wherein ingress VP 504-4 and egress VP 506-3 are both terminated at the switch 502. Furthermore, a VCC 512 of VP 506-3 is also terminated at the switch 502.

As is well known, virtual path service provisioning not only reduces network management complexity, but it also allows for additional applications such as wide area networking. For instance, a network manager could buy a virtual path between two enterprise locations from a wide area carrier. With the virtual path in place, the network manager could set up and clear virtual channels without having to coordinate with the carrier management. Based on the size of the VCI field, it can be seen that more than 65,000 virtual channels could be set up between two locations if needed and the terminal has the capacity.

Whereas the conventional ATM connection hierarchy described above may provide sufficient functionality for typical applications, such hierarchy is inadequate with respect to conditions where customer-level isolation and management is required. The present invention is directed, accordingly, to a novel connection hierarchy for bundling the VCCs, VPCs, or both into another level of connection, called a Virtual Group Connection or VGC, to which certain connection resources can be commonly assigned for management as a single virtual pipe.

Figure 6A:
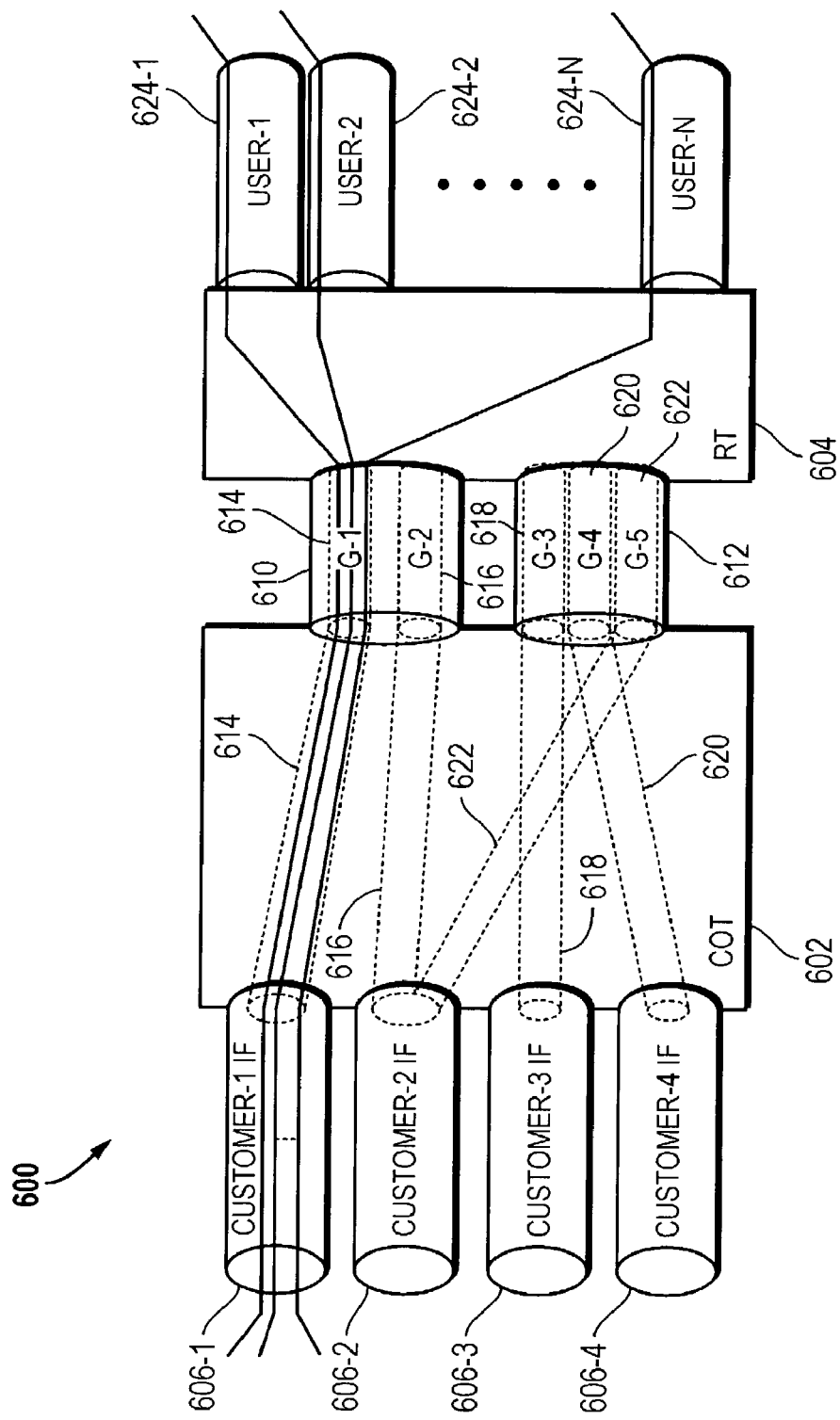
FIG. 6A depicts an embodiment of the present invention's VGC scheme in an access network.

Referring now to FIG. 6A, depicted therein is an embodiment of the present invention's VGC scheme in an exemplary access network portion 600. An access node 602 having ATM switching capability is deployed as a COT node in a manner described in the *Hierarchical Scheduler Architecture* application incorporated by reference hereinabove. Another access node 604 is deployed as an RT node connected to the COT 602, forming at least a portion of the access network 600. A plurality of customer interfaces 606-1 through 606-4 are supported on the ingress side of the COT 602, each interface having its own range of VCCs and VPCs, and associated connection resources (e.g., bandwidth, buffering, processor resources, raw number of connections, range of VPI/VCI values, et cetera). For instance, the network operator of the access network 600 could bundle its connection capacity into a number of isolated VGCs wherein each VGC can be purchased by a customer based on its needs. Such customers can include, e.g., Internet Service Providers (ISPs), Internet Access Providers (IAPs), Competitive Local Exchange Carriers (CLECs), and the like, each having to service a number of its own subscribers. By having a dedicated VGC and associated resources, a customer can advantageously manage its internal subscriber connections without having to coordinate its operations with the access network provider. From the standpoint of the access network provider, on the other hand, it makes better economics (e.g., efficient scaling) to sell and manage groups of connections rather than individual connections. Additionally, such a scheme provides fairness in terms of appropriate allocation of the resources.

Continuing with FIG. 6A, reference numerals 614-622 refer to a plurality of VGCs effectuated within the COT node 602 in accordance with the teachings of the present invention, which groupings are allocated among the plurality of customer interfaces 606-1 through 606-4. For instance, VGC 614 (G-1) is associated with customer interface 606-1, VGC 616 (G-2) and VGC 622 (G-5) are associated with customer interface 606-2, VGC 618 (G-3) is associated with customer interface 606-3, and VGC 620 (G-4) is associated with customer interface 606-4. Each of these VGCs can be individually treated by the switch environment of the node 620 with respect to shaping, routing, grooming, scheduling, policing, and other traffic engineering aspects.

Figure 6B:
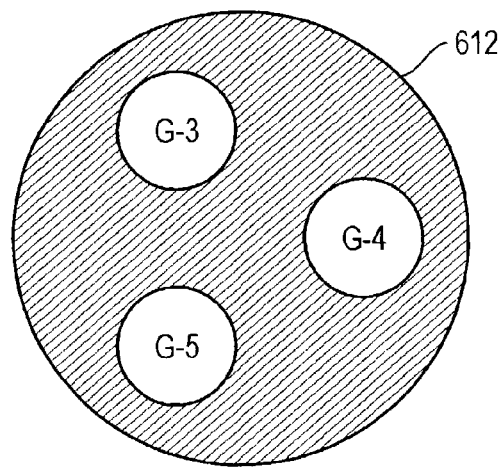
FIG. 6B depicts an exemplary access network pipe having a plurality of VGC bundles provided in accordance with the teachings of the present invention.

On the egress side of the node 602, the VGC traffic can be transported on any number of interfaces, depending on the configuration of inter-terminal pathways of the access network 600. For instance, a pair of pathways 610 and 612 are disposed between the COT node 602 and the RT node 604, wherein traffic relating to VGCs 614 and 616 is transported on pathway 610 and traffic relating to VGCs 618, 620 and 622 is transported on pathway 612. FIG. 6B shows an exemplary representation of the bandwidth/resource pipe associated with all the connections that are supported on the pathway 612. Whereas the G-3, G-4 and G-5 areas diagrammatically represent the amount of resources allocated to these groups, the remaining cross-hatched area represents the resource space occupied by the connections managed directly by the access network operator. Referring again to FIG. 6A, a plurality of users 624-1 through 624-N whose connections are bundled together as G-1 614 are serviced by RT 604 that receives the G-1 group on its ingress interface coupled to the pathway 610.

Figure 7:
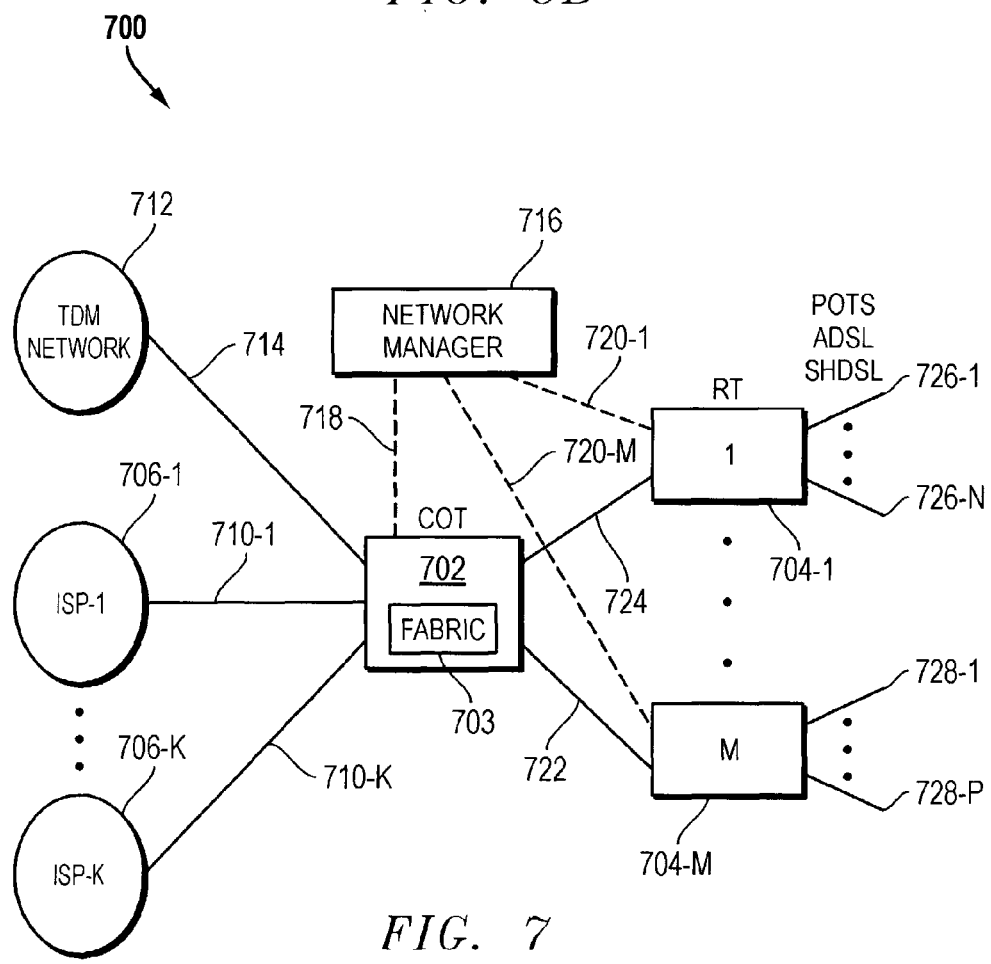
FIG. 7 depicts an exemplary access network wherein VGC bundling functionality may be provided as part of a COT node.

FIG. 7 depicts an exemplary access network 700 wherein VGC bundling functionality may be provided as part of a COT node 702 operable to serve a plurality of ISPs 706-1 through 706-K. Whereas a network manager 716 associated with the access network 700 is responsible for management and provisioning of the VGC bundles, each customer (i.e., ISP) is manages its own VGC and resource allocation therefor. Each of the ISPs communicates with the COT via a suitable link, e.g., a DS-3 or OC-3 link, disposed therebetween. Reference numerals 710-1 through 710-K refer to exemplary high-speed links between the customers and the access network's COT. A TDM network 712 may also be coupled to the COT via a path 714 that embodies a DS-1 or STS-1 link. A number of RT nodes, e.g., RT 704-1 through RT 704-M, are coupled to the COT node 702 via links operable to carry VGC bundles as described above. Preferably, these inter-terminal links are implemented as high-speed redundant links, e.g., links 722 and 724, at OC-12 rates. The COT and RT nodes are in control communication with the network manager 716 via control links 718 and 720-1 through 720-M. Each RT node is operable to serve a plurality of subscribers using access loops implemented in a variety of technologies such as POTS, xDSL, et cetera, using known and heretofore unknown media (e.g., copper, fiber, wireless, and the like). For instance, reference numerals 726-1 through 726-N refer to the subscriber line interfaces serviced by RT 704-1 and reference numerals 728-1 through 728-P refer to the subscriber line interfaces serviced by RT 704-M.

Figure 8:
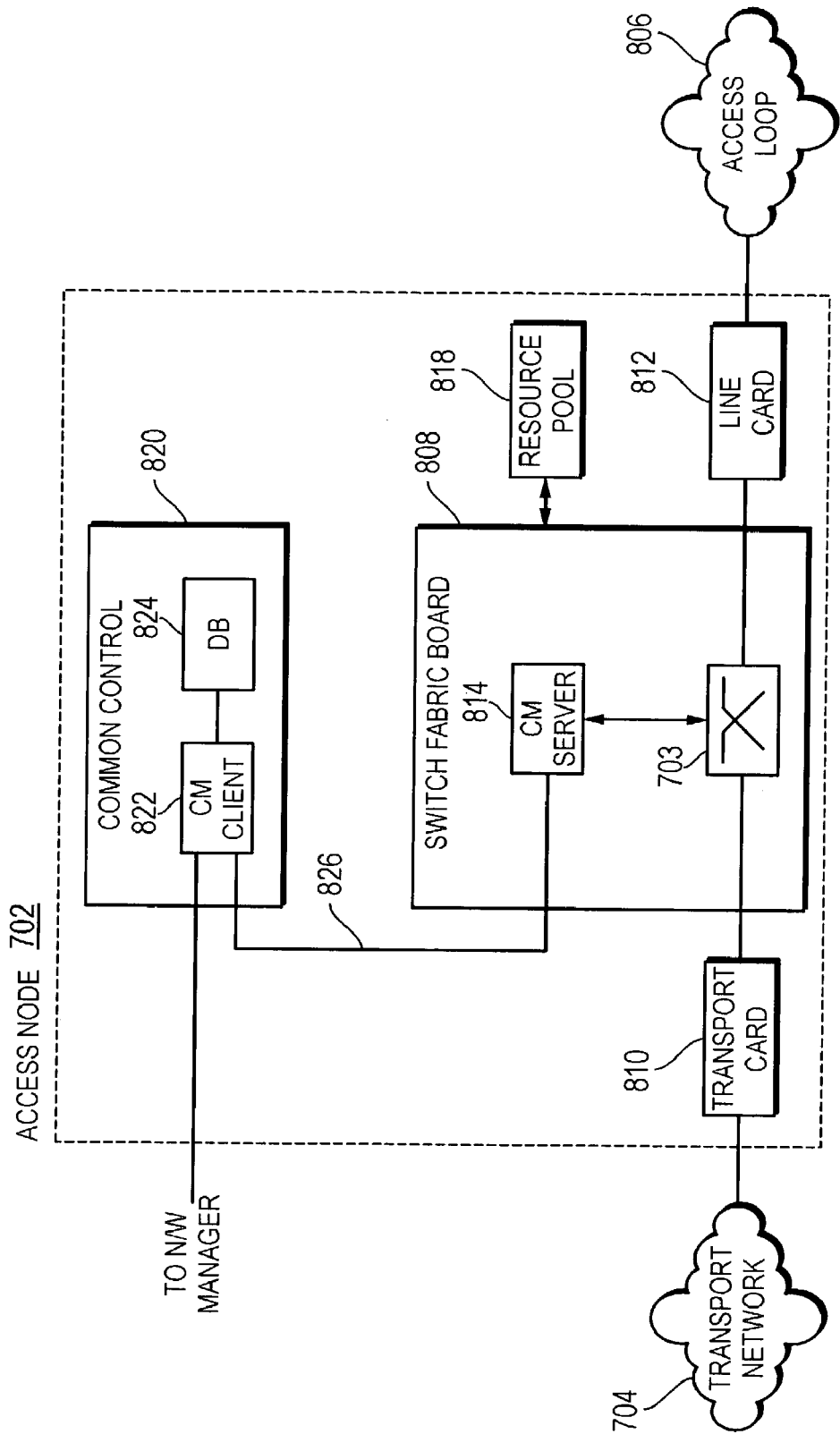
FIG. 8 depicts a high level functional block diagram of the COT node shown in FIG. 7.

FIG. 8 depicts a high level functional block diagram of the COT node 702 that exemplifies connection management (CM) architecture which can be used for provisioning VGCs. For purposes of illustration, the COT node 702 is coupled to the transport network 704 via a transport card 810 and to an access loop portion 806 via a line card 812. A switch fabric board 808 includes the ATM switch fabric 703 and a CM server 814. A plurality of connection resources, e.g., bandwidth, number of connections, VPI/VCI ranges, buffers, processor resources, etc., are diagrammatically represented as a resource pool block 818 associated with the fabric board 808.

A common control block 802 of the node 702 includes a CM client 822 and a provisioning database 824. Connection-related messaging is effectuated between CM client 822 and CM server 814 via pathway 826. The CM module on the switch board 808 acts as a server in a client-server architecture and serves connection-related requests from multiple clients by interacting with local resources 818 such as queues, VPI/VCI pool, bandwidth, as well as remote resources such as line cards. VGC provisioning messages may be forwarded from the network manager to the CM layer of the access node comprising the foregoing client-server arrangement. Customer-level associations with VGCs may be maintained, which can be provisioned with appropriate resource allocations, in the database 824.

Figure 9:
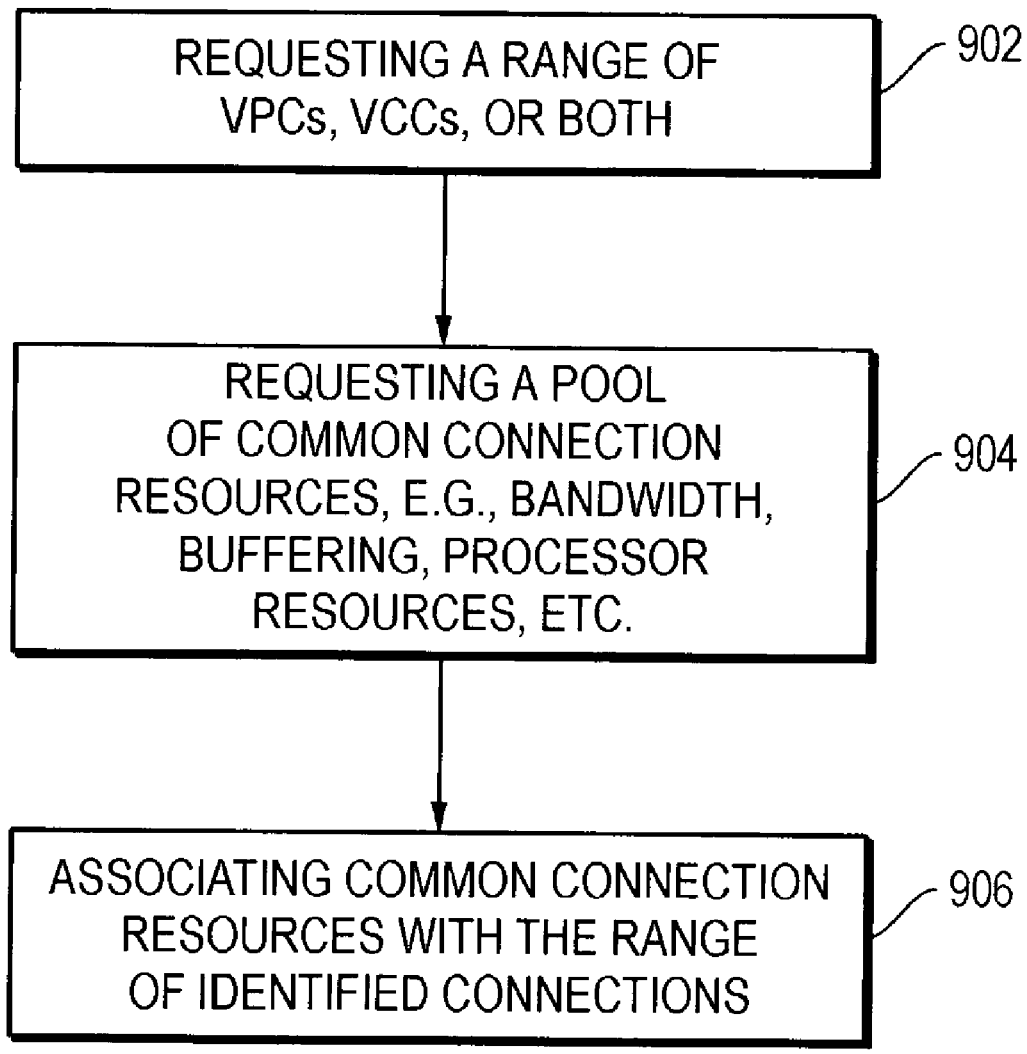
FIG. 9 is a flow chart of the operations involved in provisioning a VGC of the present invention.

Referring now to FIG. 9, depicted therein is a flow chart of the operations involved in provisioning a VGC that is bundled in accordance with the teachings of the present invention. A plurality of VCCs, VPCs, or both are requested by the network manager for bundling as a virtual group (block 902). A pool of resources to be commonly shared by the identified group of connections (i.e., VCCs and VPCs) are requested (block 904). Thereafter, the resource pool is associated with the identified group of connections (block 906), which are managed as a single connection entity (i.e., VGC).

Based upon the foregoing Detailed Description, it should be appreciated that the present invention advantageously provides an innovative ATM connection hierarchy that reduces management complexity, adds to fairer resource provisioning, and supports a customer-friendly revenue model. By utilizing effectively isolated group resources as provisioned by the access network operator, customers can be in charge of their own subscriber management in a more focused way.

It is believed that the operation and construction of the present invention will be apparent from the foregoing Detailed Description. While the embodiments of the invention shown and described have been characterized as being exemplary, it should be readily understood that various changes and modifications could be made therein without departing from the scope of the present invention as set forth in the following claims.

What is claimed is:

1. A Virtual Group Connection (VGC) arrangement for grouping Asynchronous Transfer Mode (ATM) connections in an access node, comprising:
   a plurality of Virtual Path Connections (VPCs), each having at least one Virtual Channel Connection (VCC); and
   a pool of connection resources commonly associated with said plurality of VPCs, wherein said VPCs are operable to be managed as a single virtual pipe that creates a Virtual Group Connection (VGC) wherein a plurality of VGCs are grouped onto a single pathway and are operable to be managed on the single pathway and wherein a plurality of users of at least one VGC are serviced by an access node that receives the at least one VGC on an ingress interface coupled to the single pathway and wherein a network manager is responsible for managing and provisioning the plurality of VGCs and each customer manages its own VGC and resource allocation for its own VGC wherein a central office terminal (COT) node provides VGC bundling functionality and wherein the COT node is coupled to a transport network via a transport card and to an access loop portion via a line card and wherein the transport card and the line card are both contained within the COT node and wherein a switch fabric board includes the ATM connections and a connection management (CM) server and wherein said pool of connection resources is associated with the switch fabric board and wherein a common control block of the COT node includes a connection management (CM) client and a provisioning database.

2. The VGC arrangement for grouping ATM connections as set forth in claim 1, further comprising a plurality of VCCs separate from said plurality of VPCs, wherein said pool of connection resources are operable to be allocated to cover said plurality of VCCs and wherein the plurality of VGCs are operable to be managed on the single pathway with respect to buffering, processor resources and raw number of connections.

3. The VGC arrangement for grouping ATM connections as set forth in claim 1, wherein the CM server on the switch fabric board acts as a server and serves connection related requests from multiple customers by interacting with local resources.

4. The VGC arrangement for grouping ATM connections as set forth in claim 3, wherein VGC provisioning messages are forwarded from the network manager to the CM client.

5. The VGC arrangement for grouping ATM connections as set forth in claim 4, wherein said pool of connection resources includes at least one of a range of Virtual Channel Identifiers (VCIs), an amount of bandwidth, an amount of buffer space, processor resources, and a range of Virtual Path Identifiers (VPIs) and wherein connection-related messaging is effectuated between the CM client and the CM server.

6. The VGC arrangement for grouping ATM connections as set forth in claim 1, further comprising means for specifying a predetermined number of ATM connections as said single virtual pipe.

7. The VGC arrangement for grouping ATM connections as set forth in claim 1, wherein said single virtual pipe is associated with a single customer.

8. The VGC arrangement for grouping ATM connections as set forth in claim 7, wherein said single customer is an Internet Service Provider (ISP).

9. The VGC arrangement for grouping ATM connections as set forth in claim 7, wherein said single customer is a Competitive Local Exchange Carrier (CLEC).

10. A Virtual Group Connection (VGC) method for grouping Asynchronous Transfer Mode (ATM) connections, comprising the steps:
specifying a number of ATM connections to be grouped together as a single virtual pipe;
specifying a pool of connection resources; and
associating said pool of connection resources with said single virtual pipe that creates a Virtual Group Connection (VGC) wherein a plurality of VGCs are grouped onto a single pathway and are operable to be managed on the single pathway and wherein a plurality of users of at least one VGC are serviced by an access node that receives the at least one VGC on an ingress interface coupled to the single pathway and wherein a network manager is responsible for managing and provisioning the plurality of VGCs and each customer manages its own VGC and resource allocation for its own VGC wherein a central office terminal (COT) node provides VGC bundling functionality and wherein the COT node is coupled to a transport network via a transport card and to an access loop portion via a line card and wherein the transport card and the line card are both contained within the COT node and wherein a switch fabric board includes the ATM connections and a connection management (CM) server and wherein said pool of connection resources is associated with the switch fabric board and wherein a common control block of the COT node includes a connection management (CM) client and a provisioning database and wherein the CM server on the switch fabric board acts as a server and serves connection related requests from multiple customers by interacting with local resources and wherein VGC provisioning messages are forwarded from the network manager to the CM client.

11. The VGC method for grouping ATM connections as set forth in claim 10, wherein said pool of connection resources includes an amount of bandwidth.

12. The VGC method for grouping ATM connections as set forth in claim 10, wherein said pool of connection resources includes an amount of buffer space.

13. The VGC method for grouping ATM connections as set forth in claim 10, wherein said pool of connection resources includes processor resources.

14. The VGC method for grouping ATM connections as set forth in claim 10, wherein said pool of connection resources includes a range of Virtual Path Identifiers (VPIs).

15. The VGC method for grouping ATM connections as set forth in claim 10, wherein said pool of connection resources includes a range of Virtual Channel Identifiers (VCIs).

16. The VGC method for grouping ATM connections as set forth in claim 10, wherein said connections comprise Virtual Path Connections (VPCs).

17. The VGC method for grouping ATM connections as set forth in claim 10, wherein said connections comprise Virtual Channel Connections (VCCs).

18. The VGC method for grouping ATM connections as set forth in claim 10, wherein said single virtual pipe is associated with a single customer.

19. The VGC method for grouping ATM connections as set forth in claim 18, wherein said single customer is a Competitive Local Exchange Carrier (CLEC).

20. The VGC method for grouping ATM connections as set forth in claim 18, wherein said single customer is an Internet Service Provider (ISP).

21. A system for grouping Asynchronous Transfer Mode (ATM) connections, comprising:
means for specifying a number of ATM connections to be grouped together as a single virtual pipe;
means for specifying a pool of connections resources; and
means for associating said pool of connections resources with said single virtual pipe that creates a Virtual Group Connection (VGC) wherein a plurality of VGCs are grouped onto a single pathway and are operable to be managed on the single pathway and wherein a plurality of users of at least one VGC are serviced by an access node that receives the at least one VGC on an ingress interface coupled to the single pathway and wherein a network manager is responsible for managing and provisioning the plurality of VGCs and each customer manages its own VGC and resource allocation for its own VGC wherein a central office terminal (COT) node provides VGC bundling functionality and wherein the COT node is coupled to a transport network via a transport card and to an access loop portion via a line card and wherein the transport card and the line card are both contained within the COT node and wherein a switch fabric board includes the ATM connections and a connection management (CM) server and wherein said pool of connection resources is associated with the switch fabric board and wherein a common control block of the COT node includes a connection management (CM) client and a provisioning database and wherein the CM server on the switch fabric board acts as a server and serves connection related requests from multiple customers by interacting with local resources and wherein VGC provisioning messages are forwarded from the network manager to the CM client.

22. The system for grouping ATM connections as set forth in claim 21, wherein said pool of connection resources includes an amount of bandwidth.

23. The system for grouping ATM connections as set forth in claim 21, wherein said pool of connection resources includes an amount of buffer space.

24. The system for grouping ATM connections as set forth in claim 21, wherein said pool of connection resources includes processor resources.

25. The system for grouping ATM connections as set forth in claim 21, wherein said pool of connection resources includes a range of Virtual Path Identifiers (VPIs).

26. The system for grouping ATM connections as set forth in claim 21, wherein said pool of connection resources includes a range of Virtual Channel Identifiers (VCIs).

27. The system for grouping ATM connections as set forth in claim 21, wherein said connections comprise Virtual Path Connections (VPCs).

28. The system for grouping ATM connections as set forth in claim 21, wherein said connections comprise Virtual Channel Connections (VCCs).

29. The system for grouping ATM connections as set forth in claim 21, wherein said single virtual pipe is associated with a single customer.

30. The system for grouping ATM connections as set forth in claim 29, wherein said single customer is a Competitive Local Exchange Carrier (CLEC).

31. The system for grouping ATM connections as set forth in claim 29, wherein said single customer is an Internet Service Provider (ISP).

* * * * *